United States Patent Office 3,186,825
Patented June 1, 1965

3,186,825
MIXED FERTILIZERS HAVING A UREA SOURCE OF NITROGEN IN EXCESS OF A NITRATE SOURCE
David S. Price, Wilmington, Del., assignor to E. I. du Pont de Nemours and Company, Wilmington, Del., a corporation of Delaware
No Drawing. Filed Apr. 1, 1963, Ser. No. 269,784
2 Claims. (Cl. 71—28)

This invention relates to improved mixed fertilizers manufactured from ammoniating solutions having a high urea nitrogen content in the presence of ammonium nitrate, which fertilizers are non-hydroscopic.

By "mixed fertilizers" is meant those which are made by adding an ammoniating solution to fertilizer ingredients which include potassium chloride, and one or more of the following: superphosphates, sulfuric acid and conventional fillers such as dolomite, pulverized limestone, sand, etc.

It is well recognized in the fertilizer art that mixed fertilizers ideally contain at least two types of nitrogen sources; i.e., those which are immediately available to the plants being treated and also those which are available to the plants over longer periods of time. Conventionally, then, mixed fertilizers contain immediately available nitrogen in the form of a nitrate, and urea nitrogen which is gradually converted by bacteria to nitrate nitrogen over a longer period of time.

Most desirably, mixed fertilizers would have as much of the nitrogen present as possible in the form of urea because the immediately available nitrate nitrogen can be quickly leached out of the soil by water. Urea nitrogen which is not so readily leached from the soil, remains in the vicinity of the plant root zone for much longer periods of time.

Additionally, it is also desirable to produce mixed fertilizers, the particles of which are granular or spherical in form rather than the pulverized form which is flaky, dusty and consists of amorphous particulate matter varying in size and shape. As a granular or spherical form, mixed fertilizers are easier to handle and less likely to be widely scattered and lost by climatic elements.

To obtain both longer acting and immediately available nitrogen sources, mixed fertilizers can be prepared by admixing, in situ, an ammoniating solution containing urea and a suitable nitrate along with other conventional componets, to the potassium chloride ad other fertilizer ingredients such as superphosphates, sulfuric acid and filler components. Advantageously, the ammoniating solution uses ammonium nitrate as the nitrate nitrogen source. Ammonium nitrate, in addition to supplying the fertilizer end product with an immediate nitrate source, aids in producing the desirable fertilizer end product which is granular or spherical in form. As mentioned above, the fertilizer components, to which the ammoniating solution is added, includes potassium chloride. It is known that potassium chloride and ammonium nitrate are incompatible as such in the same solution, such that potassium chloride exchanges its chloride ion for the nitrate ion of ammonium nitrate. However, the extent to which this exchange of ions takes place varies under the influence of other components present in the solution.

For example, in a simple aqueous solution of potassium chloride and ammonium nitrate, the chloride-nitrate ion exchange occurs substantially instantaneously in a ratio of stoichiometric proportions. But when other components are also present, this ion exchange takes place in a ratio wherein less than the stoichiometric quantity of ammonium nitrate instantaneously exchanges its nitrate ion for the chloride ion of potassium chloride.

Because of this incompatibility of potassium chloride and ammonium nitrate in solution, and because potassium nitrate is less soluble than its precursor ammonium nitrate, the potassium nitrate crystallizes out of the solution. This crystallization-precipitation of potassium nitrate carries with it the other components of the fertilizer end product intimately associated therewith. As such, the fertilizer end product upon tumbling becomes granular in form.

It has been observed, however, that when mixed fertilizer products contain both urea and ammonium nitrate in the end product, the amount of urea that can be present therein has been limited. As set forth by H. H. Tucker in "Proceedings of the Fertilizer Industry Round-Table," 1959, pages 33–40, past practice has limited the content of urea in mixed fertilizers to an amount between 20 to 50 pounds of urea per ton of end product.

The reason the urea content of mixed fertilizers has been limited is because increases in urea content in the presence of any amount of ammonium nitrate increases the hygroscopicity of the fertilizer end product. Fertilizers which pick up water upon storage in bins or packages become excessively damp or wet and tacky, rendering them very difficult to handle. They are not readily broken up and spread out over the area to be treated.

As described by Juilus Silverberg et al., in an article entitled, "Fertilizer Caking—Microscopic Study of the Mechanism of Caking and Its Prevention in Some Granular Fertilizers," appearing in "Agricultural and Food Chemistry," volume 6, No. 6, June 1958, pages 442–448, and particularly at page 445, mixed fertilizers made with ammonium nitrate-urea containing ammoniating solutions in the past have undergone the earlier described crystallization ion exchange reaction slowly over extended periods of time. Thus, ammonium nitrate in considerable amounts remained as such in the presence of urea in the fertilizer end product. With ammonium nitrate present in the fertilizer end product any attempt to increase the urea content thereof produced an excessively hygroscopic material.

Thus it is observed that when ammoniating solutions containing urea and relatively large quantities of ammonium nitrate are added to fertilizer ingredients which contain potassium chloride, a granular fertilizer end product is produced which however has in the past been excessively hygroscopic when the more desirable urea nitrogen source has been increased above a maximum of about 50 pounds per ton of fertilizer end product. In other words, the very conditions which are optimum for producing granulation of the components also produce undesirable hygroscopic fertilizer end products.

I have found that this problem is overcome by using an ammoniating solution containing an amount of ammonium nitrate which when added to the fertilizer ingredients as described above is 60% or less of the stoichiometric quantity required to react with the potassium chloride of the fertilizer ingredients. More specifically, an improved, granular, relatively non-hygroscopic fertilizer product which can contain up to about 280 pounds of urea per ton of end product from an ammoniating solution can be made by using an ammoniating solution containing ammonium nitrate in an amount ranging from about 5% through 60% of that which would react stoichiometrically with the amount of potassium chloride included in the fertilizer ingredients. The total urea content of the fertilizer product can be increased above 275 pounds per ton of end product by including additional solid urea in the fertilizer ingredients.

In this way the potassium chloride included in the fertilizer ingredients is effective to react with all of the ammonium nitrate present in the ammoniating solution to form potassium nitrate and ammonium chloride. Because all of the ammonium nitrate present prior to mixing the ammoniating solution with the fertilizer ingredients is converted to ammonium chloride and potassium nitrate, there is no ammonium nitrate present in the fertilizer end product. Accordingly, the urea content of the ammoniating solution and thereby also the urea content of the fertilizer end product can be increased over and above that possible with past practice without increasing the hygroscopicity of the fertilizer end product. More specifically, the urea source of nitrogen in the fertilizer end product can be increased to an amount ranging from about 8% to 160% in excess of the nitrate source of nitrogen.

According to this invention an ammoniating solution is first prepared which contains urea, ammonium nitrate, ammonia and water. Also, some carbon dioxide is often combined with a portion of the free ammonia as ammonium carbamate. The proportions by weight of carbon dioxide, ammonia and water are as follows:

| | Percent |
|---|---|
| Ammonia | 25–35 |
| Water | 9–19 |
| Carbon dioxide | 0–10 |

The amounts of urea and ammonium nitrate chosen for the ammoniating solution will vary depending on the total urea content desired in the fertilizer end product. Since it is desirable to have as high a urea content as possible, the amount of urea selected for the ammoniating solution will range from 26% to 36% by weight. Depending upon the urea content selected for the ammoniating solution, the balance of the nitrogen content desired will be made up from ammonium nitrate. In any event, however, the amount of ammonium nitrate present in the ammoniating solution will be greater than 5% but up through 60% or less of the stoichiometric quantity which would react with the potassium chloride of the fertilizer ingredients. Since it is most desirable to have 60% or less of the stoichiometric quantity of ammonium nitrate present to react with the potassium chloride, the ammonium nitrate content of the ammoniating solution will range from approximately 14 to 24% by weight.

Depending upon the grade of fertilizer being produced the percentage by weight of the above ammoniating solution used will normally range from about 10 to 45%. Where higher nitrogen content is desired, as for example, 15% total nitrogen, the amount of ammonium nitrate present will range from about 30% to 50% of the amount required to stoichiometrically react with the potassium chloride used, while lower nitrogen content, such as about 5% total nitrogen, requires that the ammonium nitrate range from about 5% to 15% of the stoichiometric requirement. Values ranging between 5% and 20% total nitrogen will require amounts of ammonium nitrate which fall in the range from 5% through 60% of the stoichiometric quantity required to react with the selected amount of potassium chloride used in the fertilizer ingredients. The optimum amount of ammoniating solution required for any particular ratio of nitrogen, potassium chloride, and superphosphate selected for a fertilizer end product will be apparent to those skilled in the art following the above teachings.

The ammoniating solution prepared as above described is added to selected proportions of dry fertilizer ingredients. These ingredients are usually superphosphates, potassium chloride, with or without sulfuric acid or phosphoric acid and an optional filler such as dolomite.

Upon addition of the ammoniating solution to the above fertilizer ingredients containing sulfuric acid the temperature of the resulting mixture can be increased up to about 200° F. to 250° F. At this increased temperature substantially all of the highly soluble solids of the fertilizer product are dissolved in the fertilizer solution. The ammonium nitrate supplied by the ammoniating solution and the potassium chloride supplied by the fertilizer ingredients exchange ions as described earlier to form potassium nitrate and ammonium chloride which are less soluble than their precursor salts. Being less soluble, upon a few degrees decrease in temperature of the mixed fertilizer solution and particularly as the temperature drops below about 200° F., the potassium nitrate and ammonium chloride crystallize out of sloution. As the salts crystallize out of the solution they form the nucleus for the formation of granules as they gather together the other fertilizer ingredients while continuously being tumbled over and over themselves to form generally spherical, granular particles. The product thus formed is a granular mixed fertilizer.

The fertilizer product, however, can be made as a non-granular or amorphous material and yet still maintain the advantageous high urea content of this invention. By reduction in the amount or elimination of sulfuric acid present, or by the use of other acids or other external heat sources, the temperature during the mixing of the ammoniating solution of the present invention with the other fertilizer ingredients can be maintained at lower levels than above. Lower temperatures decrease the above granulation activity such that the fertilizer product will become less granular or non-granular in form. Nevertheless, if stoichiometry is maintained between the ammonium nitrate and potassium chloride in accordance with this invention, urea in excess of 50 pounds per ton of fertilizer end product can be contained therein without substantailly increasing its hygroscopicity.

Since the ammonium nitrate content of the ammoniating solution is chosen so as to be 60% or less than the stoichiometric quantity required to react with the potassium chloride present, all of the ammonium nitrate is reacted with the potassium chloride to form ammonium chloride and potassium nitrate. Accordingly, no ammonium nitrate per se is present in the fertilizer end product such that an increased amount of urea can be present therein without increasing its hygroscopicity.

As shown by the data set forth in Table I, the hygroscopicity of a 5–10–15 grade fertilizer product, A, made with an ammoniating solution in accordance with this invention and which contains 69 pounds of urea for approximately one ton of fertilizer product is substantially the same as for two other 5–10–15 grade fertilizer products; i.e., B, which uses an ammoniating solution which contains no ammonium nitrate, and C, which uses an ammoniating solution which contains an amount of ammonium nitrate greatly in excess of 22.5 pounds of urea contained therein to produce approximately one ton of fertilizer product.

This invention will be better understood and more easily practiced by referring to the following illustrative examples:

EXAMPLE 1

A 5–10–15 grade mixed fertilizer is prepared by first formulating an ammoniating solution as follows:

| | Percent |
|---|---|
| Urea | 32.3 |
| Ammonium nitrate | 17.8 |
| Ammonium carbamate | 13.4 |
| Ammonia | 25.2 |
| $H_2O$ | 11.3 |

Two hundred fourteen pounds of the above formulation is added to 1,854 pounds of fertilizer ingredients consisting of:

| | Pounds |
|---|---|
| Normal superphosphate (20% $P_2O_5$) | 1000 |
| Potassium chloride (62% $K_2O$) | 484 |
| Sulfuric acid (60° Bé.) | 175 |
| Dolomite filler | 199 |

The resulting mixed fertilizer is granular in form and has a total urea content of 3.45% by weight (69 pounds of urea per ton of fertilizer product).

Upon final storage for three months the fertilizer product remains dry and free flowing substantially as prepared.

of solid urea from the fertilizer ingredients per ton of product).

Upon final storage for three months the fertilizer product remains dry and free flowing substantially as prepared.

EXAMPLE 5

A 20–10–10 grade mixed fertilizer is prepared by adding 856 pounds of the ammoniating solution of Example 1 to 1348 pounds of fertilizer ingredients consisting of:

| | Pounds |
|---|---|
| Phosphoric acid (54.5% $P_2O_5$) | 370 |
| Sulfuric acid (66° Bé.) | 610 |
| Potassium chloride (62% $K_2O$) | 330 |
| Bentonite clay filler | 38 |

*Table I*

HYGROSCOPICITY OF FERTILIZER PRODUCTS (5-10-15 GRADE)

[72 hr. period at 86° F.]

| Fertilizer | Ammoniating solution (lbs.) | | | | | | Fertilizer ingredients (lbs.) | | | | Total free water content (percent by weight)* | | |
|---|---|---|---|---|---|---|---|---|---|---|---|---|---|
| | Urea | Ammonium nitrate | Ammonium sulfate | Ammonium carbamate | Ammonia | $H_2O$ | Normal super-phosphate | KCl (coarse) | $H_2SO_4$ | Filler | Relative humidity | | |
| | | | | | | | | | | | 50 | 59.4 | 72.5 |
| A | 69.1 | 38.1 | | 28.7 | 53.9 | 24.2 | 1,000 | 480 | 175 | 199 | 2.5 | 3.7 | 21.9 |
| B | 93.3 | | 23.3 | 37.9 | 48.2 | 30.3 | 1,000 | 480 | 175 | 193 | 1.9 | 3.5 | 17.7 |
| C | 22.5 | 126.0 | | | 55.1 | 21.4 | 1,000 | 480 | 137 | 199 | 2.7 | 3.8 | 20.7 |

*Moisture content represents the total moisture pickup of the particular sample which was first dried to zero percent free water content in accordance with the Association of Official Agricultural Chemists' Official Methods of Analysis—Air Flow Method, 2.013, 2.014, 9th edition, 1960.

EXAMPLE 2

A 10–10–15 grade mixed fertilizer is prepared by adding 428 pounds of the ammoniating solution of Example 1 to 1,672 pounds of fertilizer ingredients consisting of:

| | Pounds |
|---|---|
| Concentrated superphosphate (48% $P_2O_5$) | 84 |
| Normal superphosphate (20% $P_2O_5$) | 800 |
| Potassium chloride (62% $K_2O$) | 484 |
| Sulfuric acid (66° Bé.) | 225 |
| Dolomite filler | 79 |

The resulting mixed fertilizer is granular in form and has a total urea content of 6.9% by weight (138 pounds of urea per ton of product).

Upon final storage for three months the fertilizer product remains dry and free flowing substantially as prepared.

EXAMPLE 3

A 5–10–15 grade mixed fertilizer is prepared by adding 214 pounds of the ammoniating solution of Example 1 to 1826 pounds of fertilizer ingredients consisting of:

| | Pounds |
|---|---|
| Normal superphosphate (20% $P_2O_5$) | 1000 |
| Potassium chloride (62% $K_2O$) | 484 |
| Dolomite filler | 342 |

The resulting mixed fertilizer is non-granular in form and has a total urea content of 3.45% by weight (69 pounds of urea per ton of product).

Upon final storage for three months the fertilizer product remains dry and free flowing substantially as prepared.

EXAMPLE 4

A 15–15–15 grade mixed fertilizer is prepared by adding 428 pounds of the ammoniating solution of Example 1 to 1628 pounds of fertilizer ingredients consisting of:

| | Pounds |
|---|---|
| Concentrated superphosphate (48% $P_2O_5$) | 625 |
| Potassium chloride (62% $K_2O$) | 484 |
| Sulfuric acid (100%) | 225 |
| Solid urea (46% nitrogen) | 218 |
| Kaolin clay filler | 76 |

The resulting mixed fertilizer is granular in form and has a total urea content of 17.8% by weight (138 pounds of urea from the ammoniating solution and 218 pounds The resulting mixed fertilizer is granular in form and has a total urea content of 13.8% by weight (276 pounds of urea per ton of product).

Upon final storage for three months the fertilizer product remains dry and free flowing substantially as prepared.

EXAMPLE 6

A 5–10–15 grade mixed fertilizer is prepared by first formulating an ammoniating solution as follows:

| | Percent |
|---|---|
| Urea | 30.0 |
| Ammonium nitrate | 16.0 |
| Ammonium carbamate | 17.7 |
| Ammonia | 18.3 |
| $H_2O$ | 18.0 |
| | 100.0 |

Two hundred forty-four pounds of the above formulation is added to 1816 pounds of fertilizer ingredients consisting of:

| | Pounds |
|---|---|
| Normal superphosphate (20% $P_2O_5$) | 1000 |
| Potassium chloride (62% $K_2O$) | 484 |
| Dolomite filler | 332 |

The resulting mixed fertilizer is non-granular in form and has a total urea content of 3.65% by weight (73 pounds of urea per ton of fertilizer product).

Upon storage for three months the fertilizer product remains dry and free flowing substantially as prepared.

EXAMPLE 7

A 5–10–15 grade mixed fertilizer as prepared by first formulating an ammoniating solution as follows:

| | Percent |
|---|---|
| Urea | 27.0 |
| Ammonium nitrate | 23.5 |
| Ammonia | 31.0 |
| $H_2O$ | 18.5 |
| | 100.0 |

Two hundred and sixteen pounds of the above formulation is added to 1853 pounds of fertilizer ingredients consisting of:

| | Pounds |
|---|---|
| Normal superphosphate (20% $P_2O_5$) | 1000 |
| Potassium chloride (62% $K_2O$) | 484 |
| Sulfuric acid (60° Bé.) | 175 |
| Dolomite filler | 194 |

The resulting mixed fertilizer is granular in form and has a total urea content of 2.9% (58 pounds of urea per ton of fertilizer product).

Upon storage for three months the fertilizer product remains dry and free flowing substantially as prepared.

EXAMPLE 8

A 5–10–15 grade mixed fertilizer is prepared by first formulating an ammoniating solution as follows:

| | Percent |
|---|---|
| Urea | 35.0 |
| Ammonium nitrate | 14.5 |
| Ammonium carbamate | 16.0 |
| Ammonia | 25.5 |
| $H_2O$ | 9.0 |
| | 100.0 |

Two hundred and eight pounds of the above formulation is added to 1858 pounds of fertilizer ingredients consisting of:

| | Pounds |
|---|---|
| Normal superphosphate (20% $P_2O_5$) | 1000 |
| Potassium chloride (62% $K_2O$) | 484 |
| Sulfuric acid (60° Bé.) | 175 |
| Dolomite filler | 199 |

The resulting mixed fertilizer is granular in form and has a total urea content of 3.65% by weight (73 pounds of urea per ton of fertilizer product).

Upon storage for three months the fertilizer product remains dry and free flowing substantially as prepared.

I claim:

1. A non-hygroscopic mixed fertilizer having a urea source of nitrogen in excess of a nitrate source of nitrogen, said mixed fertilizer comprising from about 10% to 45% by weight of an ammoniating solution consisting essentially of:

| | Percent by weght |
|---|---|
| Urea | 26–36 |
| Ammonium nitrate | 14–24 |
| Ammonia | 25–35 |
| Water | 9–19 | in admixture with fertilizer ingredients which include potassium chloride and superphosphates, the content of ammonium nitrate of said ammoniating solution ranging from about 5% through 60% of that which stoichiometrically reacts with the potassium chloride content of said fertilizer ingredients.

2. A granular, non-hygroscopic, mixed fertilizer having a urea source of nitrogen in excess of a nitrate source of nitrogen, said mixed fertilizer comprising from about 10% to 45% by weight of an ammoniating solution consisting essentially of:

| | Percent by weght |
|---|---|
| Urea | 26–36 |
| Ammonium nitrate | 14–24 |
| Ammonia | 25–35 |
| Water | 9–19 | in admixture with fertilizer ingredients which include potassium chloride, superphosphate and sulfuric acid, the content of ammonium nitrate of said ammoniating solution ranging from about 5% through 60% of that which stoichiometrically reacts with the potassium chloride content of said fertilizer ingredients.

References Cited by the Examiner
UNITED STATES PATENTS

| 2,766,107 | 10/56 | White | 71—64 |
|---|---|---|---|
| 2,770,539 | 11/56 | Martenet | 71—64 |
| 2,955,930 | 10/60 | Kealy | 71—64 |
| 3,024,100 | 3/62 | Langguth et al. | 71—64 |
| 3,057,713 | 10/62 | Gessler | 71—64 |
| 3,083,081 | 3/63 | Sharp et al. | 71—64 |

DONALL H. SYLVESTER, *Primary Examiner.*
ANTHONY SCIAMANNA, *Examiner.*